July 29, 1958    H. WACKER ET AL    2,845,050
DRIVEN HAND-GUIDED WORKING DEVICES
FOR RECIPROCATING MOVEMENTS Filed Nov. 15, 1954    8 Sheets-Sheet 6

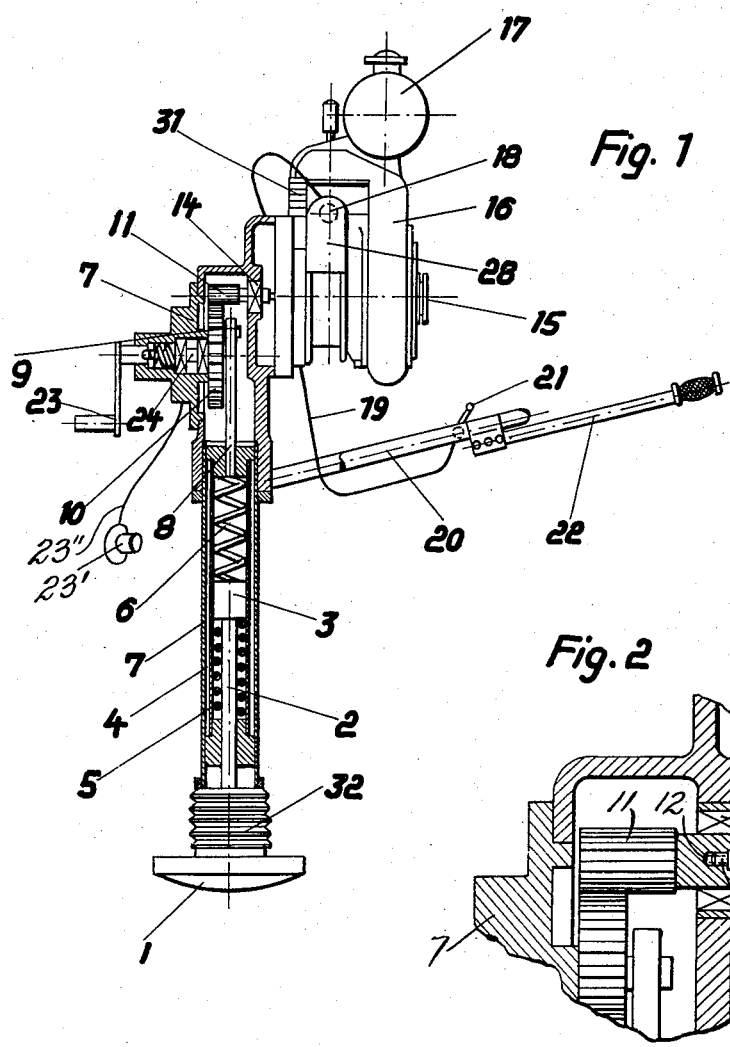

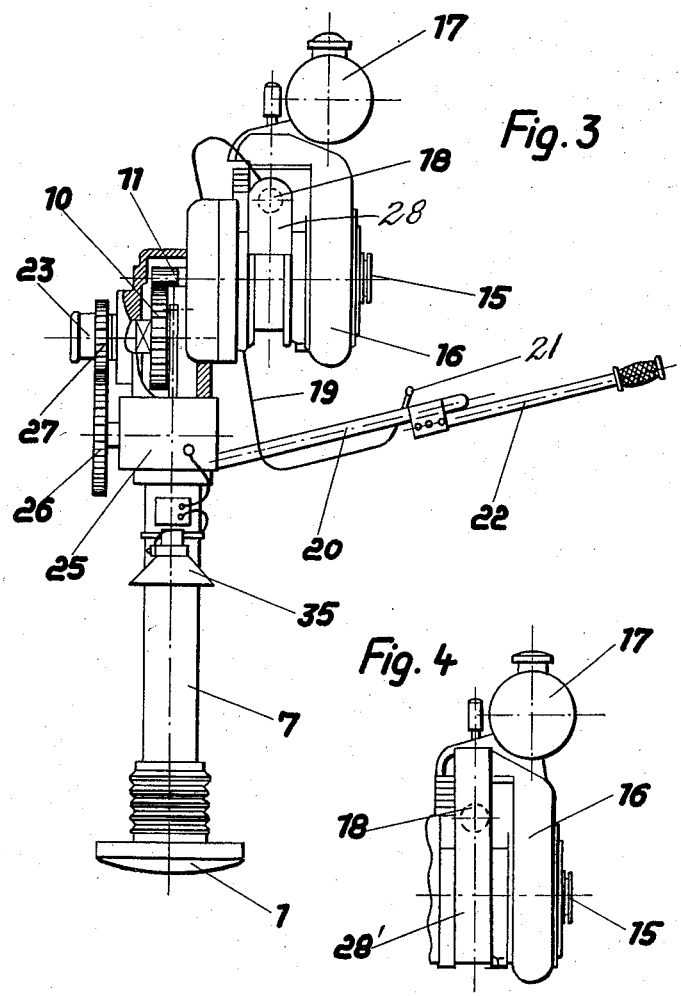

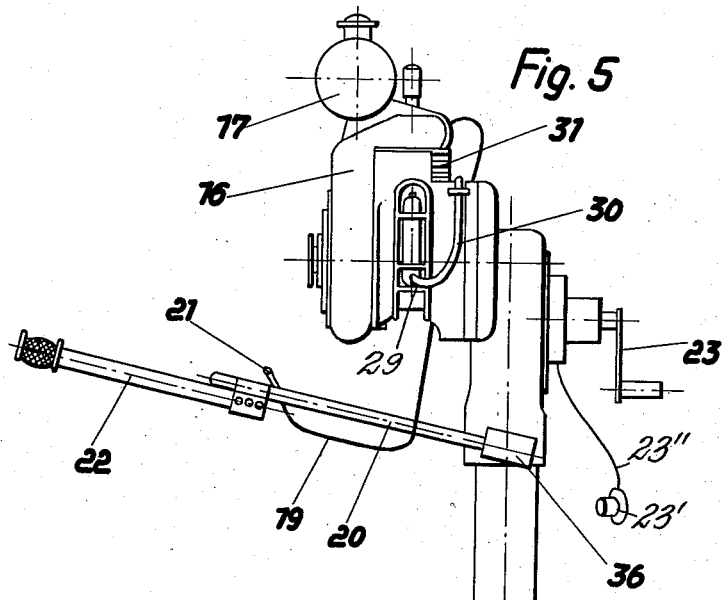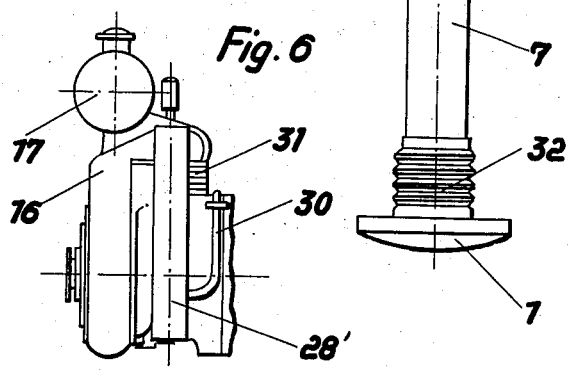

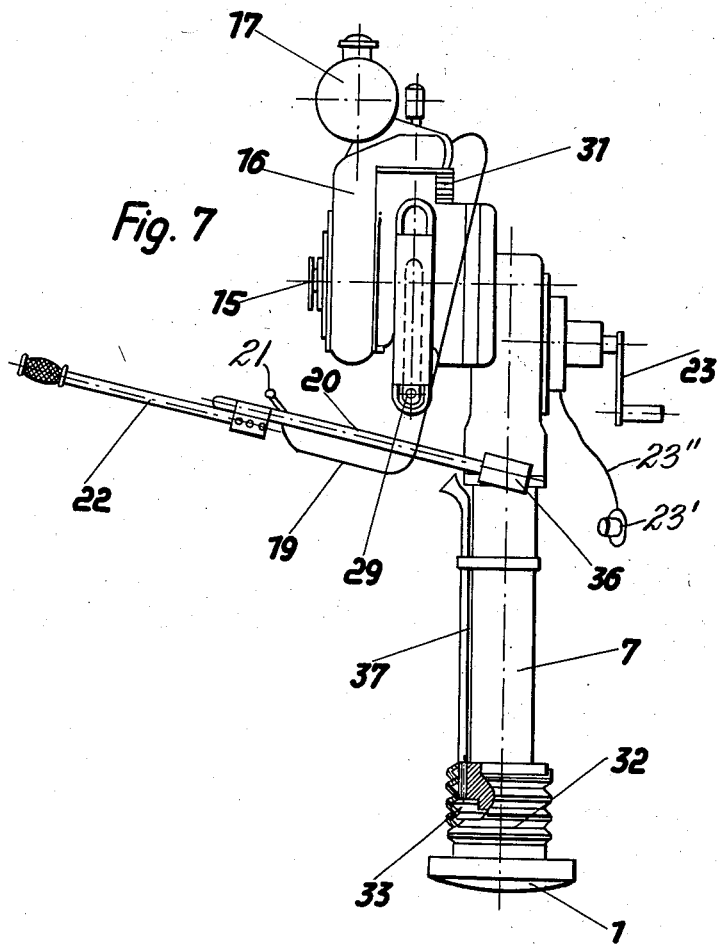

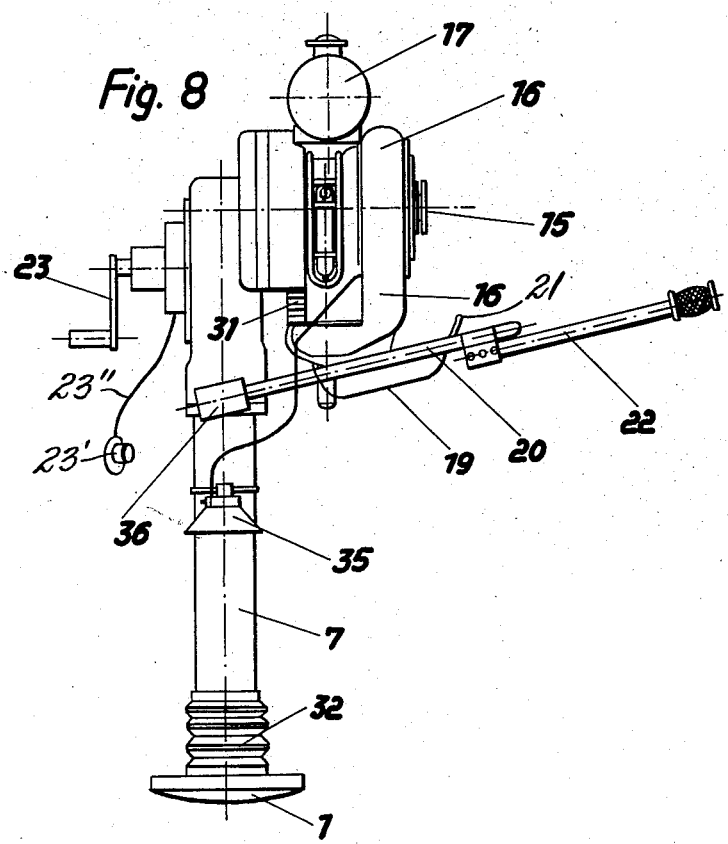

Inventors:
Hermann Wacker and Peter Wacker
By Ernest F. Montague
attorney

July 29, 1958 H. WACKER ET AL 2,845,050
DRIVEN HAND-GUIDED WORKING DEVICES
FOR RECIPROCATING MOVEMENTS
Filed Nov. 15, 1954 8 Sheets-Sheet 7

July 29, 1958

H. WACKER ET AL 2,845,050

DRIVEN HAND-GUIDED WORKING DEVICES
FOR RECIPROCATING MOVEMENTS

Filed Nov. 15, 1954

United States Patent Office 2,845,050
Patented July 29, 1958

2,845,050

DRIVEN HAND-GUIDED WORKING DEVICES FOR RECIPROCATING MOVEMENTS

Hermann Wacker and Peter Wacker, Ebenhausen-Ingolstadt, Germany

Application November 15, 1954, Serial No. 468,908

12 Claims. (Cl. 123—7)

The present invention relates to driven hand-guided working devices for reciprocating movements, such as tampers, or vibrating movements, such as vibrators. Such working devices are known having an electric drive or a drive from an internal combustion engine. In the latter case the internal combustion engine is mounted releasably fixed on the housing of the tool, and the power transmission members to the tool are directly coupled with this drive.

It is one object of the present invention to provide a working device in which an internal combustion engine is arranged on the housing of the device so as to be easily interchangeable.

It is another object of the present invention to provide a pinion which is inserted between the normal driving shaft of the internal combustion engine and the power transmission parts for the tool which are disposed in the housing; the pinion being used for reinforcing the driving shaft which becomes progressively thinner and for absorbing the recoils produced by the reciprocating or vibrating movements of the tool; and for this purpose it is also mounted in addition in the housing of the device whereby its reliability in operation is considerably increased. The transmission parts for the tool and, therefore, the internal combustion engine may be actuated externally by a starter.

It is still another object of the present invention to provide a handle which is resiliently mounted on the housing of the working device and carries the control mechanism for the internal combustion engine; and at the same time to seal the transmission parts for the tool from the outside and finally to provide means for splitting up the exhaust gases from the internal combustion engine.

It is yet another object of the present invention to provide a motor driven hand-guided working device which will answer all requirements in operation to a considerable extent.

With these and other objects in view which will become apparent in the following detailed description, the present invention will be clearly understood in connection with the accompanying drawings, in which:

Figure 1 is a section partly in side elevation, of the working device;

Fig. 2 is a fragmentary section through the upper part of the housing of the working device;

Fig. 3 is a side elevation, partly in section, of a working device similar to that of Fig. 1 with various modifications;

Fig. 4 is a fragmentary elevation showing part of the internal combustion engine;

Fig. 5 is an elevation of the workinng device disclosed in Fig. 1 viewed from the rear;

Fig. 6 is a detail showing the driving motor disclosed in Fig. 4 viewed from the rear;

Fig. 7 is an elevation showing a working device of somewhat different construction, similar to that disclosed in Fig. 5;

Fig. 8 is an elevation showing a working device similar to that disclosed in Fig. 3 in a somewhat different construction;

Figure 9:
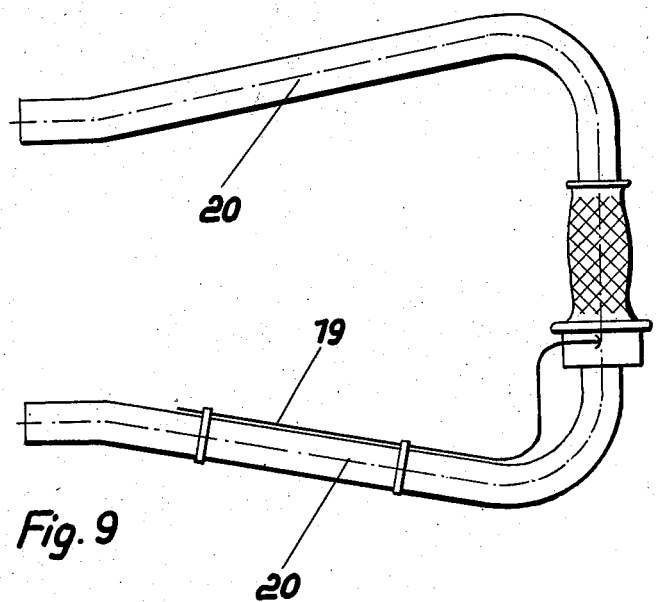
Fig. 9 is a detail showing a plan view of the guiding handle.

Referring now to the drawings and in particular to Figs. 1 and 2, a tool 1, which executes a reciprocating or vibrating movement, is interchangeably mounted on the lower end of a ram 2. The upper end of the ram 2 is constructed as a piston 3 which slides in a cylinder 4 and is subjected to the action of springs 5 and 6. In its turn, the cylinder 4 is displaceably arranged in a housing 7 of the working device. The cylinder 4 is set in a reciprocating motion by the parts of the power transmission, in the present case a crank drive. The connecting rod 8 of the crank drive engages on a crank pin 9 which is arranged on a gear wheel 10. The gear wheel 10 cooperates with a pinion 11. The pinion 11 has an inner thread 12 and an inner cone 13 and is also mounted in the housing 7 of the device by a bearing 14.

The driving motor is an internal combustion engine of normal construction having the crank or driving shaft 15 which is also constructed conically. The driving shaft has an outer thread 12' at its end. This outer thread 12' of the driving shaft and the inner thread 12 of the pinion 11 run counter-wise to the direction of rotation of the motor so that the pinion 11 is firmly screwed onto the driving shaft 15.

The internal combustion engine has in known manner an engine housing 16, a fuel tank 17, a carburetor 18 and a regulator 19 for the carburetor 18.

When the entire device is in its operating position, a guiding handle 20 is resiliently mounted on the housing of the device. A throttle control grip 21 is mounted on the guiding handle 20. In addition an extension handle 22 may be provided on the guiding handle 20, this extension handle 22 being interchangeable, reversible or adjustable.

The device shown in Fig. 1 may be started by a hand crank 23 which may be mounted externally in the housing 7 so as to be engageable on the shaft 24 of the gear wheel 10. By turning the hand crank 23 the gear wheel 10 is set in rotation which also drives the pinion 11. At the same time the transmission ratio is so selected that the necessary number of revolutions is ensured for starting the internal combustion engine. This arrangement makes it possible to start the internal combustion engine without the use or insertion of additional gears, couplings, etc.

The opening in the housing 7 receiving the crank 23 may be closed up, upon removal of the crank 23, by a stopper 23' which may be connected with the housing 7 by means of a hanging means, as a chain 23''.

The embodiment shown in Fig. 3 is generally similar in construction to that shown in Fig. 1. In this case only a starter motor 25 with a battery (not shown) is provided for starting the device. The starter motor acts on the gear wheel 10 through the gear wheels 26 and 27.

In all cases the carburetor 18, in particular, or other parts of the internal combustion engine, such as the exhaust, may be protected from the outside by coverings 28 so that it is impossible for the operators to be burned, the carburetor 18 to be soiled, or damage to be caused to the parts of the motor. Whereas, in Figs. 1 and 3, the protective covering covers only the carburetor 18, the protective covering 28' in the construction shown in Fig. 4 is made larger so that it almost encloses the internal combustion engine (see in this connection also Fig. 6).

Fig. 5 shows, as mentioned above, the device disclosed in Fig. 1 from the rear, that is to say, from the exhaust side. An exhaust pipe 30, which projects into the region of the fan 31 provided for cooling the internal combustion engine, is connected to the exhaust 29 so that the exhaust gases may be collected and split up by the air stream from the fan.

For the purpose of an efficient seal for the part sliding in the housing 7, particularly the ram 2, convoluted walls 32 are provided on the lower side of the housing 7. The space enclosed by the convoluted walls 32 is constantly reduced and enlarged by the movement of the device. The movement of the air which is thus brought about and which may be fed through a pipe 33 (Fig. 7) into the region of the exhaust 29 of the internal combustion engine so that even in this way splitting up of the combustion gases may be achieved.

As shown in Figs. 3 and 8, the device may also be fitted with an electric light 35 which is used for illuminating the working site. In order to fulfill this purpose the electric light 35 may be mounted on the device so to be pivoted and adjusted as required and operated accordingly. The necessary current for the electric light may be taken either from a battery (not shown) or from the ignition lighting system of the internal combustion engine (Fig. 8).

Figure 11:
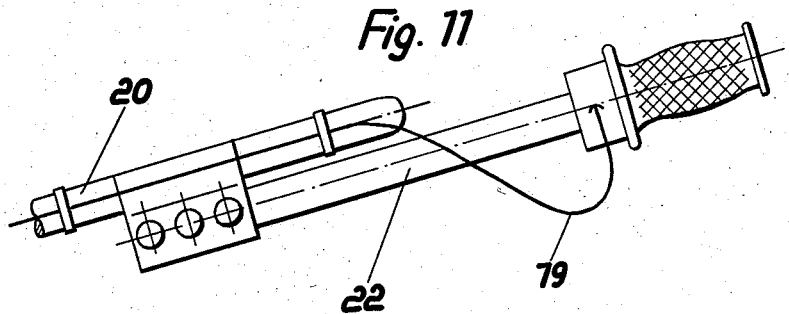
Fig. 11 is a detail in side elevation which shows the mounting of an extension handle.
Figure 10:
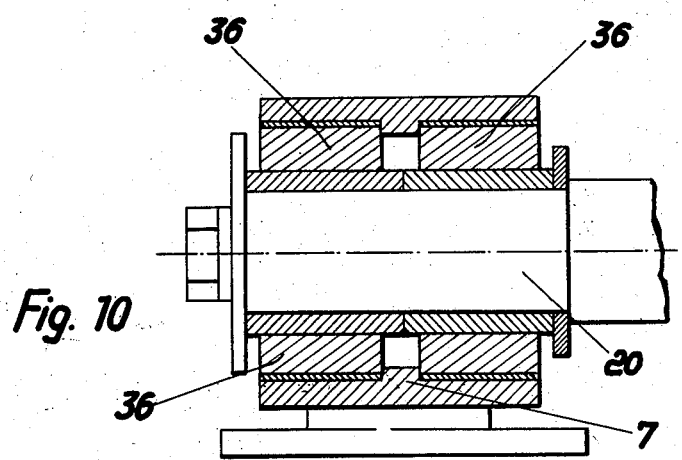
Fig. 10 is a detail showing the mounting of one end of the guiding handle of the housing of the device.

The guiding handle 20 is preferably of U-shaped construction as may be seen from Fig. 9. The two ends of the guiding handle are elastically mounted on the housing 7 of the device. For this purpose oscillating metal cushions 36 may be used as shown in Fig. 10. The oscillating metal cushions 36 are inserted between the ends of the guiding handle 20 and the housing 7 of the working device. In addition an extending handle 22, which may be easily slid out, is mounted on the guide handle 20. By this means the guiding of the device by the operator is facilitated and made free of vibrations. The throttle control 21 may then be arranged on the extending handle 22 or on the guide handle 20 and makes it possible to regulate the speed of tamping easily and rapidly (Figs. 8 and 11).

Figure 12:
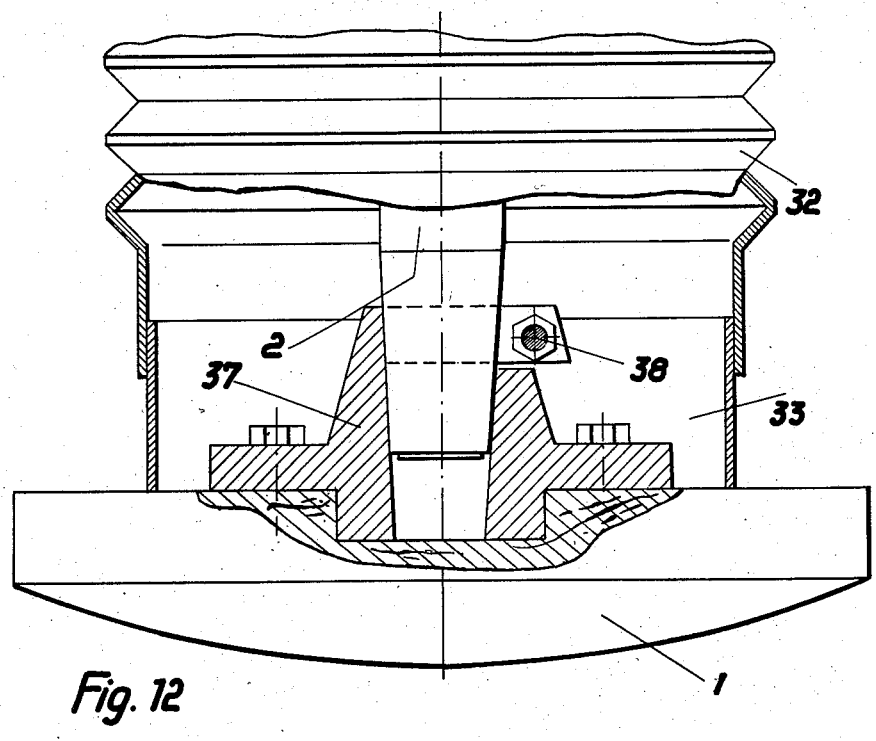
Fig. 12 is a detail partly in section showing the mounting of the tool on the lower part of the working device.
Figure 13:
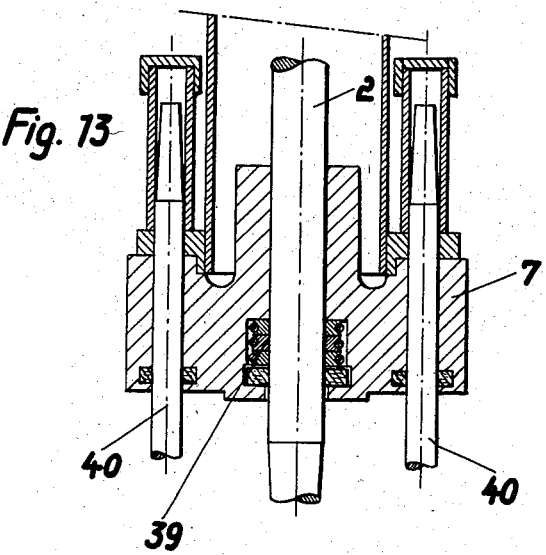
Figs. 13 and 14 are details in longitudinal and cross section, respectively, showing the guiding means of the ram of the tool.
Figure 14:
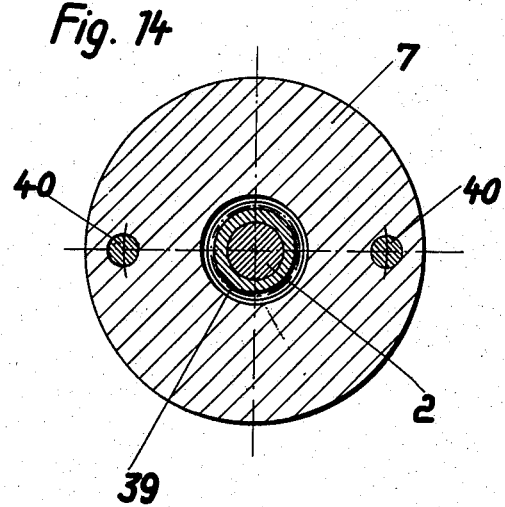

The tool 1 is preferably mounted interchangeably on the lower end of the ram 2. For this purpose the tool 1 has a conical bush 37 and a clamping device 38 (Fig. 12). The convoluted walls 32 surround this point of attachment and also the point where the ram 2 passes through the housing 7. This passage is also sealed by packing rings or sleeves 39 (Fig. 13). In order to guide the tool 1 reliably and secure the same against twisting, guiding rods 40 may also be provided which pass through the housing 7 and the passages of which are preferably located outside the cylindrical portion of the housing 7 so that dust cannot penetrate into the interior of the housing 7.

Whereas in Figs. 1, 3, and 5 the internal combustion engine 16 is so interchangeably mounted on the working device that the cylinder of the internal combustion engine is disposed above its crank shaft 15 in the embodiment disclosed in Fig. 8, an arrangement is provided according to which the cylinder of the internal combustion engine is disposed below its crank shaft. This provides a lower construction of the entire device, and in addition the center of gravity of the device is favorably displaced to the bottom so that a particularly easy manipulation of the device is achieved.

While I have disclosed several embodiments of the present invention, it is to be understood that these embodiments are given by example only and not on a limiting sense, the scope of the present invention being determined by the objects and the claims.

We claim:

1. In a hand guided working device for reciprocating or vibrating movements having a housing including a tool, an internal combustion engine interchangeably mounted on said housing and having its longitudinal axis disposed parallel to and spaced apart from the longitudinal axis of said tool, said internal combustion engine including a driving shaft, a pinion, a bearing supporting said pinion, the latter being removably secured to the said driving shaft and a power transmission operated by said pinion for reciprocating movement of said tool, the said pinion, the said bearing and the said power transmission being disposed in said housing and comprising a gear cooperating with said pinion and carrying a crank drive, a cylinder reciprocating in said housing, a piston axially movable in said cylinder, at least one spring disposed at each side of said piston in said cylinder, and a ram rod between said piston and said tool for common reciprocating movement of the latter, and starter means operatively connected with the said gear said driving shaft having at one end a conically reduced portion and a threaded end portion and said pinion having a cylindrical bore including inner thread complementary to said threaded end portion and a conically expanding bore complementary to said conically reduced portion of said driving shaft, the thread of said end portion running counterwise to the direction of rotation of said engine, thereby providing a reliable and easily removable drive connection.

2. The hand guided working device, as set forth in claim 1, in which said starter means include a hand crank, the latter operating at least a part of said power transmission.

3. The hand guided working device, as set forth in claim 1, in which said starter means include an electric starter motor, the latter operating at least a part of said power transmission.

4. The hand guided working device, as set forth in claim 1, in which said internal combustion engine includes an exhaust, a carburettor and an air filter, and covering means secured to said housing for protecting said exhaust, and said carburettor and said air filter against burning, soiling and damage, respectively, during operation of said device.

5. The hand guided working device, as set forth in claim 1, which includes an electric light pivotally mounted on said housing, said electric light being adapted for the lighting of the working site.

6. The hand guided working device, as set forth in claim 5, in which said internal combustion engine includes an ignition lighting system to be used as a current source for said electric light.

7. The hand guided working device, as set forth in claim 1, which includes packing rings disposed between said ram rod of the tool and said housing of the working device.

8. The hand guided working device, as set forth in claim 7, which includes convoluted walls of elastic deformable material disposed between said housing of the working device and the said tool in order to prevent the entrance of dirt and dust into said device.

9. The hand guided working device, as set forth in claim 7, which includes convoluted walls of elastic deformable material disposed between said tool and said housing of the working device, and in which said convoluted walls form an air stream to be used for the splitting up of exhaust gases.

10. The hand guided working device, as set forth in claim 9, in which said internal combustion engine has an exhaust opening and which includes an air pipe line, said convoluted walls defining a chamber and said pipe line being connected with said chamber and extending into the region of said exhaust opening of the internal combustion engine.

11. The hand guided working device, as set forth in claim 1, which includes guide members disposed between said housing of the working device and the said tool in order to protect said tool from twisting.

12. The hand guided working device, as set forth in claim 1, in which said internal combustion engine has an exhaust opening, and which includes pipe means connected to said exhaust opening of said internal combustion engine in order to feed exhaust gases to the region of the cooling air stream of the said internal combustion engine.

References Cited in the file of this patent

UNITED STATES PATENTS

| | | |
|---|---|---|
| 635,286 | Ambrose | Oct. 24, 1899 |
| 683,404 | Jackson | Sept. 24, 1901 |
| 849,506 | Shadall | Apr. 9, 1907 |
| 1,493,768 | Rice | May 13, 1924 |
| 2,533,487 | Maurer et al. | Dec. 12, 1950 |
| 2,627,849 | Carlson | Feb. 10, 1953 |
| 2,677,355 | Maurer et al. | May 4, 1954 |

OTHER REFERENCES

Sears, Roebuck & Co. Catalog, Spring and Summer 1955, edition 210, pp. 1183, 1184.